US011274599B2

United States Patent
Ng et al.

(10) Patent No.: US 11,274,599 B2
(45) Date of Patent: Mar. 15, 2022

(54) AIR SYSTEM SWITCHING SYSTEM TO ALLOW AERO-ENGINES TO OPERATE IN STANDBY MODE

(71) Applicant: PRATT & WHITNEY CANADA CORP., Longueuil (CA)

(72) Inventors: Kevin Ng, Ancaster (CA); Johnny Vinski, Châteauguay (CA); Adam Logan, Toronto (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 16/366,293

(22) Filed: Mar. 27, 2019

(65) Prior Publication Data

US 2020/0309038 A1    Oct. 1, 2020

(51) Int. Cl.
*F02C 9/18*    (2006.01)
*F02C 9/42*    (2006.01)
(Continued)

(52) U.S. Cl.
CPC ............... *F02C 6/02* (2013.01); *B64D 35/08* (2013.01); *F02C 6/04* (2013.01); *F02C 9/18* (2013.01);
(Continued)

(58) Field of Classification Search
CPC ........... F05D 2270/093; F05D 2270/13; B64D 35/08; F02C 6/02; F02C 6/206;
(Continued)

(56) References Cited

U.S. PATENT DOCUMENTS

| 1,010,073 A | 11/1911 | Ream |
|---|---|---|
| 2,786,331 A | 3/1957 | Willimas |

(Continued)

FOREIGN PATENT DOCUMENTS

| CA | 2965946 | 3/2018 |
|---|---|---|
| CN | 207935063 U | 10/2018 |

(Continued)

OTHER PUBLICATIONS

European Search Report issued in Application No. 20165886.1 dated Aug. 17, 2020.
(Continued)

*Primary Examiner* — Todd E Manahan
*Assistant Examiner* — Sean V Meiller
(74) *Attorney, Agent, or Firm* — Norton Rose Fulbright Canada LLP

(57) ABSTRACT

A method of operating a multi-engine aircraft having two or more gas turbine engines includes operating a first engine in a powered mode to provide motive power to the aircraft, and, in flight, operating a second engine in either a powered mode to provide motive power to the aircraft or in a standby mode to provide substantially no motive power to the aircraft. When operating the second engine in the powered mode, pressurized air is bled from a first bleed location of a compressor of the second engine. When operating the second engine in the standby mode, pressurized air is bled from a second bleed location of the compressor of the second engine and supplying the pressurized air to a bleed air system of the second engine. The second bleed location is downstream of the first bleed location within the compressor of the second engine.

12 Claims, 6 Drawing Sheets

(51) Int. Cl.
  *B64D 13/06* (2006.01)
  *F02C 6/02* (2006.01)
  *B64D 35/08* (2006.01)
  *F02C 6/04* (2006.01)
  *F02C 9/52* (2006.01)
(52) U.S. Cl.
  CPC .................................... *F02C 9/42* (2013.01);
          *F02C 9/52* (2013.01); *F05D 2220/329*
      (2013.01); *F05D 2270/093* (2013.01); *F05D*
                          *2270/13* (2013.01)
(58) Field of Classification Search
  CPC ...... F02C 6/06; F02C 6/08; F02C 9/42; F02C
          9/52; F02C 9/18; F02C 7/27; F02C 7/277
  See application file for complete search history.

(56) References Cited

U.S. PATENT DOCUMENTS

| | | | |
|---|---|---|---|
| 3,851,464 A | 12/1974 | Davis et al. | |
| 3,869,862 A | 3/1975 | Dickey | |
| 4,083,181 A | 4/1978 | Adamson | |
| 4,213,738 A | 7/1980 | Williams | |
| 4,217,755 A | 8/1980 | Williams | |
| 4,251,985 A | 2/1981 | Sullivan | |
| 4,625,510 A | 12/1986 | Evans | |
| 4,627,234 A | 12/1986 | Schuh | |
| 4,741,164 A | 5/1988 | Slaughter | |
| 4,900,231 A | 2/1990 | Kennedy | |
| 5,018,601 A | 5/1991 | Waddington et al. | |
| 5,161,364 A | 11/1992 | Bruun et al. | |
| 5,429,208 A | 7/1995 | Largillier et al. | |
| 5,553,449 A | 9/1996 | Rodgers et al. | |
| 5,553,461 A | 9/1996 | Hitzigrath et al. | |
| 6,282,882 B1 | 9/2001 | Dudd, Jr. et al. | |
| 6,344,949 B1 | 2/2002 | Albrecht et al. | |
| 6,751,979 B2 | 6/2004 | Leathers | |
| 6,792,746 B2 | 9/2004 | Saito et al. | |
| 6,845,606 B2 | 1/2005 | Franchet et al. | |
| 6,868,664 B2 | 3/2005 | Albero et al. | |
| 6,885,917 B2 | 4/2005 | Osder et al. | |
| 6,921,244 B2 | 7/2005 | Johnson | |
| 7,104,282 B2 * | 9/2006 | Hooker ..................... | F02C 9/18 |
| | | | 137/625.64 |
| 7,121,078 B2 | 10/2006 | Turco et al. | |
| 7,328,098 B1 | 2/2008 | VanderLeest et al. | |
| 7,464,533 B2 | 12/2008 | Wollenweber | |
| 7,584,618 B2 | 9/2009 | Amiot et al. | |
| 7,584,619 B2 | 9/2009 | Granitz et al. | |
| 7,797,962 B2 | 9/2010 | Kresser et al. | |
| 7,843,354 B2 | 11/2010 | Holt et al. | |
| 7,861,536 B2 | 1/2011 | Alecu et al. | |
| 7,959,109 B2 | 6/2011 | Dasilva et al. | |
| 7,980,052 B1 | 7/2011 | Paulino | |
| 8,245,493 B2 | 8/2012 | Minto | |
| 8,453,462 B2 | 6/2013 | Wichmann et al. | |
| 8,511,058 B2 | 8/2013 | Agrawal et al. | |
| 8,529,189 B2 | 9/2013 | Brown et al. | |
| 8,778,091 B1 | 7/2014 | Lockyer | |
| 8,967,528 B2 | 3/2015 | Mackin et al. | |
| 9,068,463 B2 | 6/2015 | Pandey et al. | |
| 9,068,465 B2 | 6/2015 | Pandey et al. | |
| 9,205,927 B2 | 12/2015 | Shepard et al. | |
| 9,222,578 B2 | 12/2015 | Long | |
| 9,279,341 B2 | 3/2016 | Durocher et al. | |
| 9,297,304 B2 | 3/2016 | Nordstrom | |
| 9,359,949 B2 | 6/2016 | Olivarez et al. | |
| 9,611,947 B2 | 4/2017 | Hallisey et al. | |
| 9,624,831 B2 | 4/2017 | Brousseau et al. | |
| 9,631,512 B2 | 4/2017 | Lockyer | |
| 9,810,158 B2 | 11/2017 | Foutch et al. | |
| 9,902,500 B2 | 2/2018 | Stadler et al. | |
| 9,903,221 B2 | 2/2018 | Jacobs et al. | |
| 9,995,222 B2 | 6/2018 | Schwarz et al. | |
| 10,054,051 B2 * | 8/2018 | Foutch ..................... | F02K 3/02 |
| 10,060,358 B2 | 8/2018 | Tiwari et al. | |
| 10,100,744 B2 * | 10/2018 | Mackin ..................... | F02C 7/27 |
| 10,107,206 B2 | 10/2018 | Forcier et al. | |
| 10,125,691 B2 | 11/2018 | Feulner et al. | |
| 10,138,812 B2 | 11/2018 | Heaton et al. | |
| 10,155,592 B2 | 12/2018 | McAuliffe et al. | |
| 10,293,945 B2 | 5/2019 | Hoffjann et al. | |
| 10,415,468 B2 | 9/2019 | Ackermann et al. | |
| 10,451,491 B2 | 10/2019 | Chapman | |
| 10,458,267 B2 | 10/2019 | Gibson et al. | |
| 10,458,278 B2 | 10/2019 | Avis et al. | |
| 10,461,348 B2 | 10/2019 | Im et al. | |
| 10,487,751 B2 | 11/2019 | DiBenedetto | |
| 10,508,601 B2 | 12/2019 | Sheridan et al. | |
| 10,563,590 B2 | 2/2020 | Coldwate et al. | |
| 10,569,887 B2 | 2/2020 | Valiquette et al. | |
| 2002/0189230 A1 | 12/2002 | Franchet et al. | |
| 2003/0131585 A1 | 7/2003 | Saito et al. | |
| 2004/0168427 A1 | 9/2004 | Truco et al. | |
| 2006/0123796 A1 | 6/2006 | Aycock et al. | |
| 2007/0289285 A1 | 12/2007 | Jorn | |
| 2010/0058731 A1 | 3/2010 | Haehner et al. | |
| 2010/0326085 A1 | 12/2010 | Veilleux | |
| 2011/0271687 A1 | 11/2011 | Nordstrom et al. | |
| 2012/0023962 A1 | 2/2012 | Wichmann et al. | |
| 2012/0139370 A1 | 6/2012 | Pal | |
| 2012/0240588 A1 | 9/2012 | Patel et al. | |
| 2012/0304663 A1 | 12/2012 | Weber et al. | |
| 2013/0040545 A1 | 2/2013 | Finney | |
| 2013/0174574 A1 * | 7/2013 | Heaton ..................... | F02C 7/28 |
| | | | 60/785 |
| 2014/0366547 A1 | 12/2014 | Kraft et al. | |
| 2016/0003144 A1 | 1/2016 | Kupratis | |
| 2016/0123237 A1 | 5/2016 | Spagnoletti | |
| 2016/0273393 A1 | 9/2016 | Ekanayake et al. | |
| 2016/0332737 A1 * | 11/2016 | Sabnis ..................... | F02C 9/18 |
| 2016/0369695 A1 | 12/2016 | Perlak et al. | |
| 2017/0016399 A1 | 1/2017 | Bedrine et al. | |
| 2017/0106985 A1 | 4/2017 | Stieger et al. | |
| 2017/0191419 A1 | 7/2017 | Bayraktar et al. | |
| 2017/0210478 A1 | 7/2017 | Mackin | |
| 2017/0268431 A1 | 9/2017 | Schwarz | |
| 2017/0298836 A1 | 10/2017 | Tiwari et al. | |
| 2017/0335772 A1 * | 11/2017 | Coldwate ................. | F02C 7/18 |
| 2017/0369180 A1 * | 12/2017 | Jones ..................... | B64C 13/38 |
| 2018/0010520 A1 | 1/2018 | Iwasaki et al. | |
| 2018/0022463 A1 | 1/2018 | Teicholz et al. | |
| 2018/0045115 A1 | 2/2018 | Glann et al. | |
| 2018/0058336 A1 | 3/2018 | Munevar | |
| 2018/0073428 A1 | 3/2018 | Morgan et al. | |
| 2018/0080378 A1 | 3/2018 | Alecu | |
| 2018/0080380 A1 | 3/2018 | Simonetti | |
| 2018/0093778 A1 | 4/2018 | Spack et al. | |
| 2018/0128176 A1 | 5/2018 | Staubach et al. | |
| 2018/0135525 A1 | 5/2018 | Morgan et al. | |
| 2018/0334918 A1 | 11/2018 | Ortiz et al. | |
| 2019/0010876 A1 | 1/2019 | Deroy et al. | |
| 2019/0032574 A1 | 1/2019 | Maguire et al. | |
| 2019/0063324 A1 | 2/2019 | Gould et al. | |
| 2019/0232497 A1 | 8/2019 | Tall et al. | |
| 2019/0283887 A1 | 9/2019 | Ernst et al. | |
| 2019/0309683 A1 | 10/2019 | Mackin et al. | |
| 2019/0368417 A1 * | 12/2019 | Terwilliger ............... | F02C 9/42 |
| 2019/0383167 A1 | 12/2019 | Schwarz et al. | |
| 2019/0383220 A1 | 12/2019 | Mackin | |
| 2020/0032702 A1 | 1/2020 | Kupratis | |
| 2020/0095931 A1 * | 3/2020 | Vinski ..................... | F02C 3/08 |
| 2020/0248627 A1 * | 8/2020 | Amari ..................... | F02C 7/27 |

FOREIGN PATENT DOCUMENTS

| | | |
|---|---|---|
| EP | 1923575 | 5/2008 |
| EP | 2267288 | 12/2010 |
| EP | 2407652 A1 | 1/2012 |
| EP | 3095703 | 11/2016 |
| EP | 3282094 | 2/2018 |
| EP | 3318727 | 5/2018 |
| EP | 3323727 | 5/2018 |

(56) References Cited

FOREIGN PATENT DOCUMENTS

| WO | 2012007341 A1 | 1/2012 |
| WO | 2013154630 | 10/2013 |
| WO | 2014033220 A1 | 3/2014 |

OTHER PUBLICATIONS

The PW100 Engine: 20 Years of Gas Turbine Technology Evolution, E. Hosking, D. P. Kenny, R. I. McCormick S. H. Moustapha, P. Sampath, A. A. Smailys, presented at the RTO A VT Symposium on "Design Principles and Methods for Aircraft Gas Turbine Engines", held in Toulouse, France, May 11-15, 1998, and published in RTO MP-8—relevant section : p. 4-7, col. 2, lines 5-12.

European Search Report dated Feb. 11, 2021 for Application No. 20166019.8.

John H. Perepezko, The Hotter the Engine, the Better, Nov. 20, 2009, AAAS, Science, www.sciencemag.org vol. 326, pp. 1068-1069.

S. Kuz'michev, V. N. Rybalko, A. Y. Tkachenko and I. N. Krupenich, Optimization of Working Process Parameters of Gas Turbine Engines Line On the Basis of Unified Engine Core, ARPN Journal of Engineering and Applied Sciences, vol. 9, No. 10, Oct. 2014, ISSN 1819-6608, p. 1877.

European Search Report dated Jun. 10, 2021 for Application No. 20201413.0.

\* cited by examiner

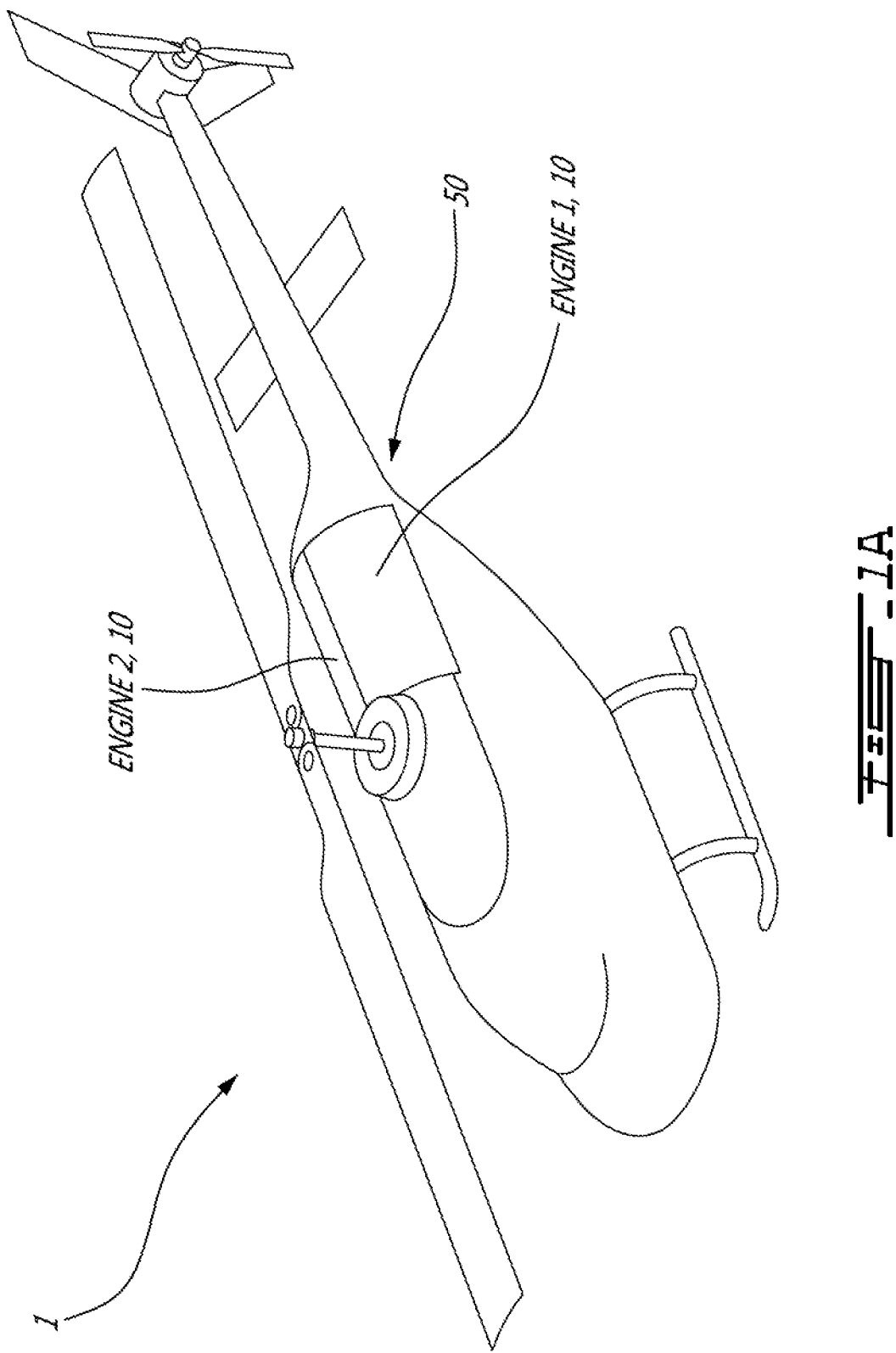

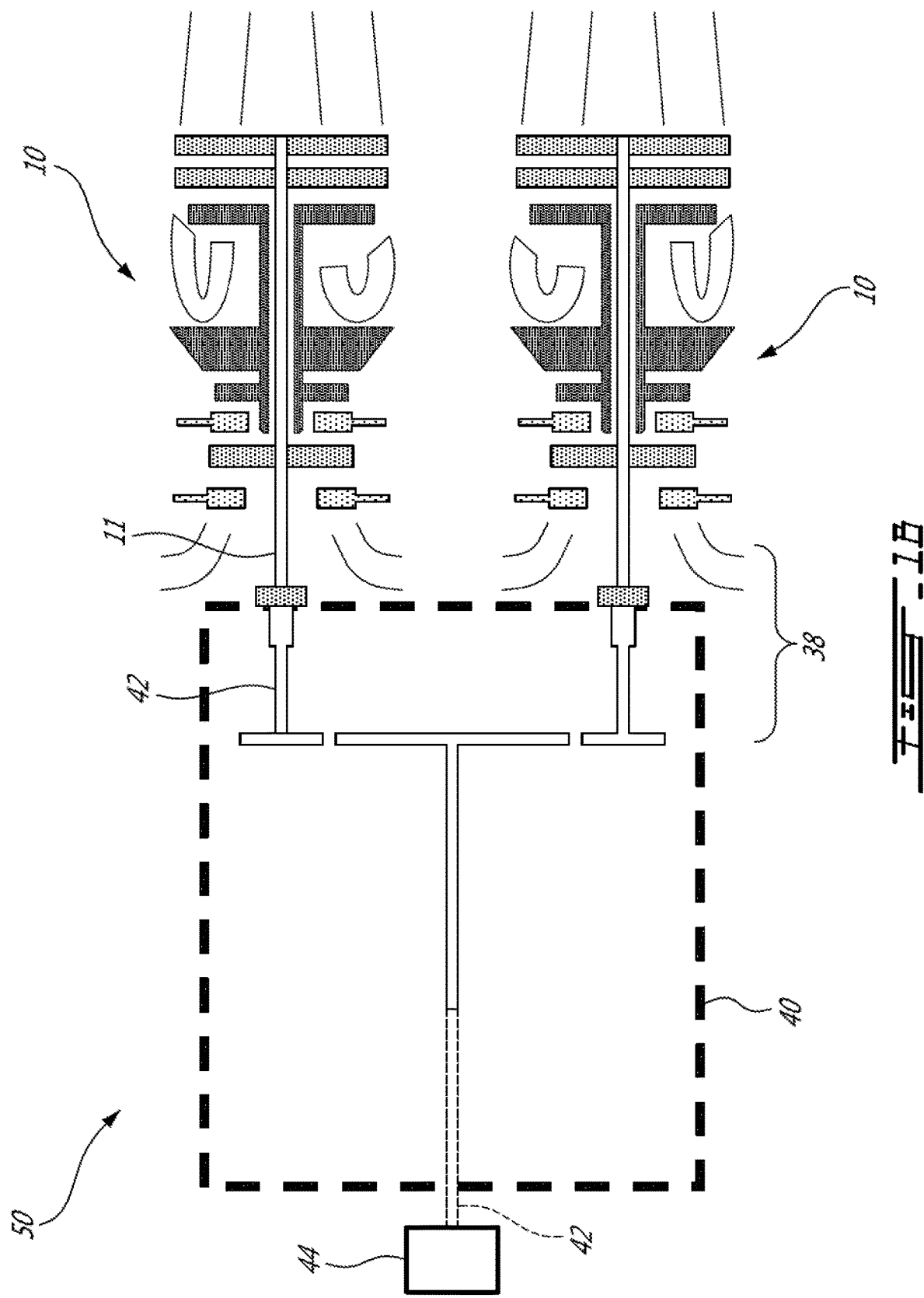

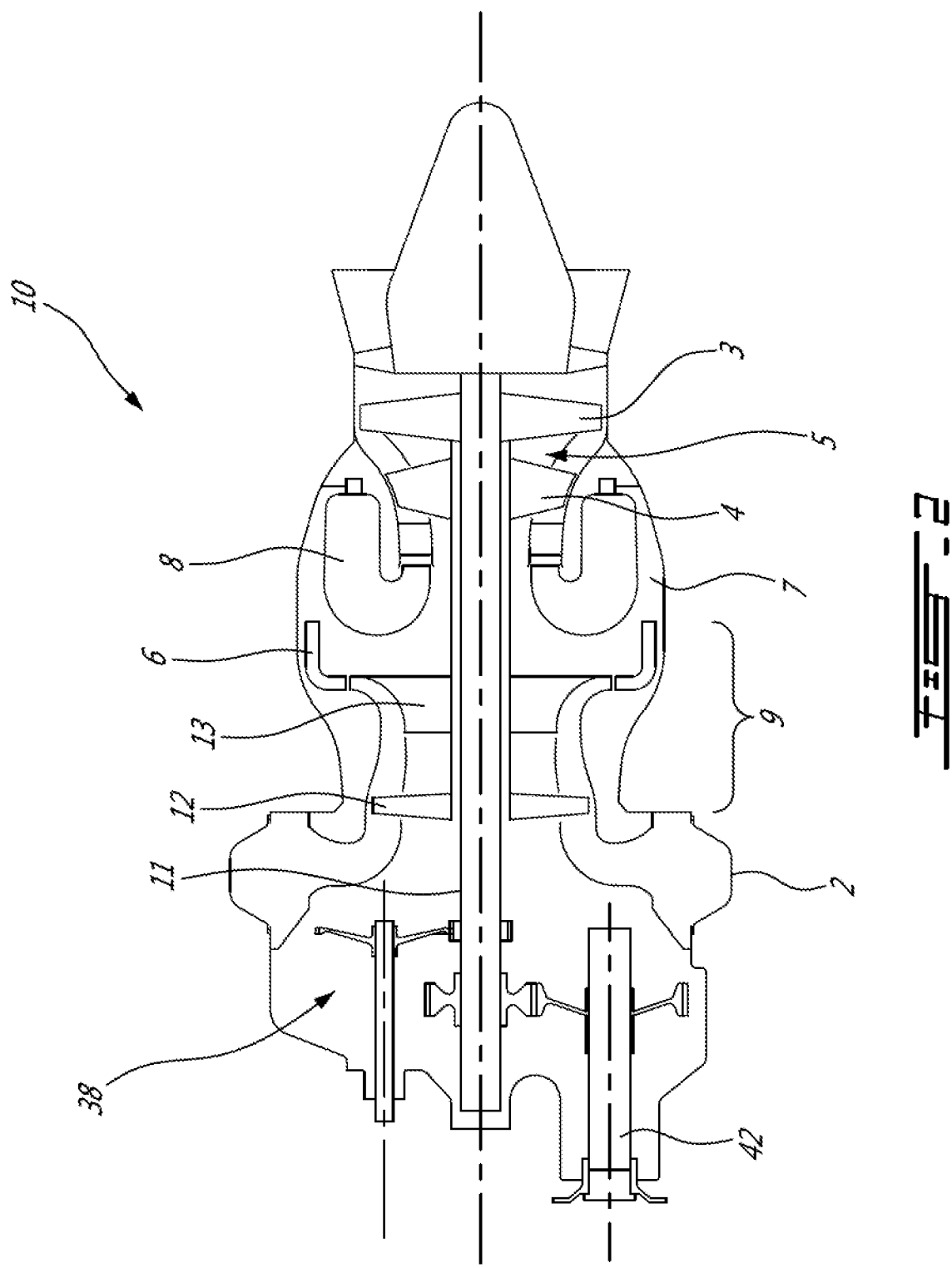

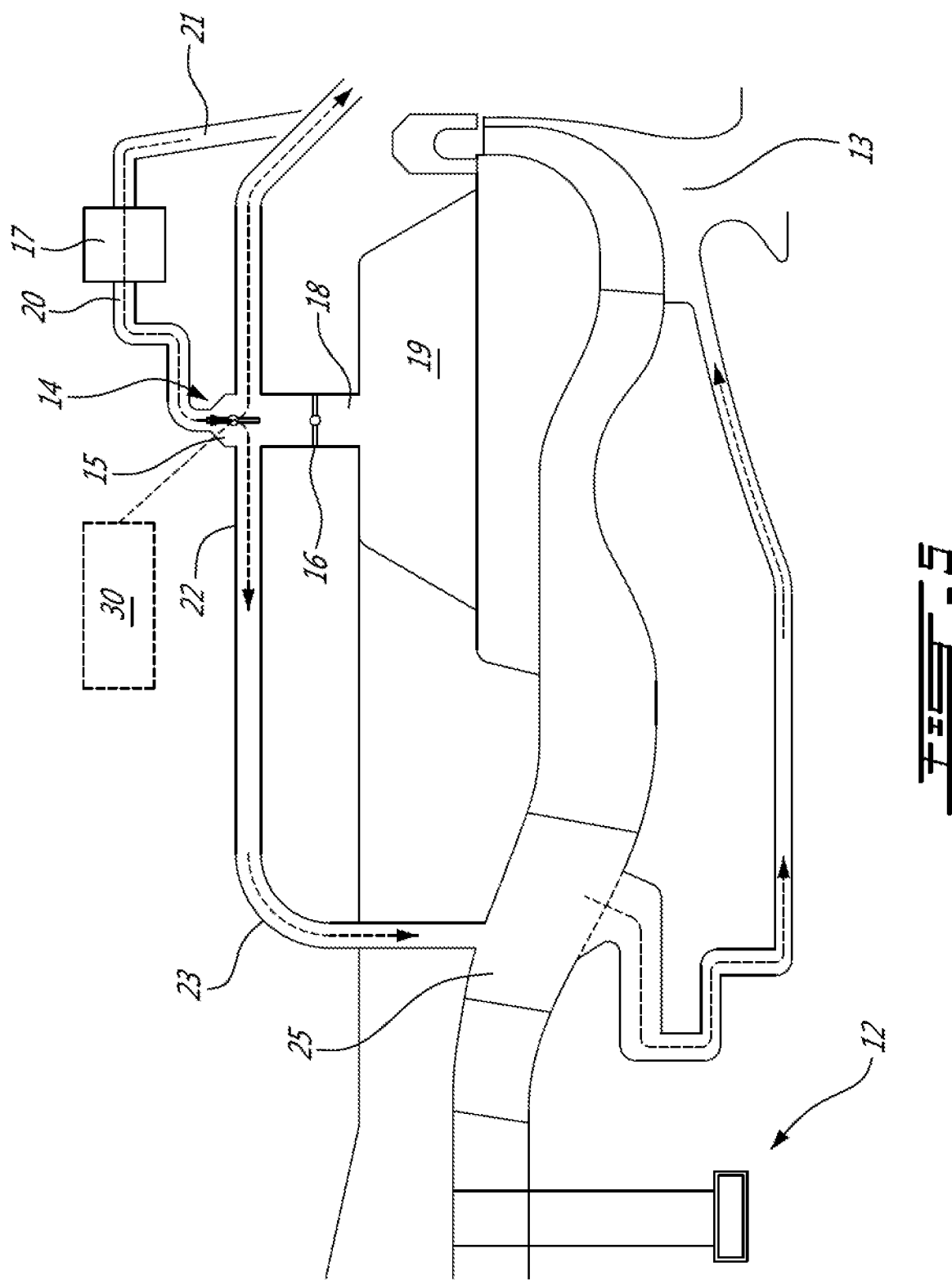

AIR SYSTEM SWITCHING SYSTEM TO ALLOW AERO-ENGINES TO OPERATE IN STANDBY MODE

TECHNICAL FIELD

The disclosure relates to operation of a multi-engine aircraft and, more particularly, to operation of engine air systems for such a multi-engine aircraft.

BACKGROUND

Bleed air produced by a gas turbine engine is compressed air from the compressor stage that is used for engine functions (such as cooling of turbines and to help seal bearing cavities, for example) and is also used for aircraft functions (such as engine starting, cabin pressure, pneumatic systems, pressurizing liquid tanks, etc.). Engine bleed air can be derived from the high pressure or the low pressure compressor stage, depending on the air pressure requirements and the engine operating condition. Low pressure stage air is typically used during high power engine operation, and high pressure stage air may be used during descent and other low power engine operations.

Bleed air may be used within an engine for engine functions such as bearing cavity sealing and cooling of various engine components. Improvement is desirable to optimize operation of the efficiency of compressed air systems.

SUMMARY

There is accordingly provided a method of operating a multi-engine aircraft having two or more gas turbine engines, the method comprising: in flight, operating a first engine of the gas turbine engines in a powered mode to provide motive power to the aircraft; in flight, operating a second engine of the gas turbine engines in either a powered mode to provide motive power to the aircraft or in a standby mode to provide substantially no motive power to the aircraft; when operating the second engine in the powered mode, bleeding pressurized air from a first bleed location of a compressor section of the second engine; and when operating the second engine in the standby mode, bleeding pressurized air from a second bleed location of the compressor section of the second engine and supplying the pressurized air to a bleed air system of the second engine, the second bleed location of the compressor section being downstream of the first bleed location relative to main gas flow through the compressor section of the second engine.

The method defined above and herein may also further comprise one or more of the following features, in any combination, and in whole or in part.

In flight, switching the second engine between the powered mode and the standby mode.

Operating a switching valve of an air switching system of the second engine, the switching valve operable to fluidly interconnect an inlet of the bleed air system with the first bleed location or the second bleed location.

Using an input selector switch of the bleed air system to operate the bleed valve.

Reducing fuel consumption of the multi-engine aircraft by switching, in flight, the second engine from the powered mode to the standby mode.

Supplying the pressurized air bled from the first bleed location to the bleed system of the second engine during the powered mode.

Maintaining the pressurized air from the bleed system within the second engine during the standby mode and the powered mode.

Using the pressurized air from the bleed system of the second engine to pressurize seals and/or cool one or more components of the second engine.

Maintaining a power output differential between the first engine operating in the powered mode and the second engine operating in the standby mode, defined as a percentage of a second engine power to a first engine power, of between 20% and 95%.

When operating the second engine in the standby mode, maintaining a rotational speed of the second engine in the range of 40 to 70% of a rotational speed of the first engine operating in the powered mode.

Switching the second engine from the powered mode to the standby mode by: opening an actuated valve within a high pressure inlet of the second engine to automatically close a normally open check valve within a low pressure inlet of the second engine.

Sensing the second engine power output and the first engine power output; and communicating an open signal to the actuated valve when the motive power output differential is below a threshold value.

There is also provided, in accordance with another aspect, a multi-engine aircraft comprising: a first gas turbine engine for providing a first engine power output; and a second engine for providing a second engine power output, the second engine having a bleed air system and a compressed air switching system including: an switching valve having: a low pressure inlet in communication with a first bleed location in a compressor of the second engine; a high pressure inlet in communication with a second bleed location in the compressor of the second engine, the second bleed location being downstream of the first bleed location relative to main gas flow through the compressor of the second engine; and a switch outlet in communication with a bleed air system of the second engine; and wherein the switching valve is displaceable between at least first and second positions, the first position interconnecting the lower pressure inlet and the switch outlet, and the second position interconnecting the high pressure inlet and the switch outlet.

The multi-engine aircraft defined above and herein may also further comprise one or more of the following features, in any combination, and in whole or in part.

Tithe compressed air switching system is actuable between a powered mode and a standby mode, the switching valve in the first position in the powered mode and the switching valve in the second position in the standby mode.

A control system for controlling the second engine and/or the compressed air switching system thereof, the control system actuating the switching valve to switch between the first position and the second position.

The switching valve comprises: a compressed air manifold having: a check valve within the low pressure inlet being normally open when a pressure of air bled from the first bleed location exceeds a manifold air pressure; and an actuated valve within the high pressure inlet for switching between the powered mode and the standby mode.

The actuated valve is a solenoid valve in communication with the control system, the control system including a second engine power output sensor and a first engine power output sensor.

The air bleed system of the second engine communicates with an engine operation system including one of: an air pressure operated oil retention seal; an air cooled engine component; and a turbine.

The low pressure inlet comprises a low pressure plenum.

The first engine includes a bleed air system feeding an aircraft operation system including one of: an engine starting system; an anti-icing system; a water system pressurization system; a hydraulic system reservoir pressurization system; an aircraft cabin pressurization system; a cabin air conditioning system; and a wing boundary layer separation enhancement system.

Further details of these and other aspects of the subject matter of this application will be apparent from the detailed description included below and the drawings.

BRIEF DESCRIPTION OF THE DRAWINGS

FIG. 1A is a schematic view of a multi-engine aircraft;

FIG. 1B is a schematic representation of an exemplary multi-engine system for the aircraft of FIG. 1A, showing axial cross-sectional views of two gas turbine engines;

FIG. 2 is a schematic axial cross-sectional view of one of the gas turbine engines of FIG. 1B, for the multi-engine aircraft of FIG. 1A;

FIG. 3 is the schematic axial cross-sectional view of FIG. 2, showing the air switching system of the present disclosure;

FIG. 5 is an enlarged axial cross-section view of the compressor section of the gas turbine engine of FIG. 2, showing the air system switching system of FIG. 3 operating in a second mode.

DETAILED DESCRIPTION

Figure 7:
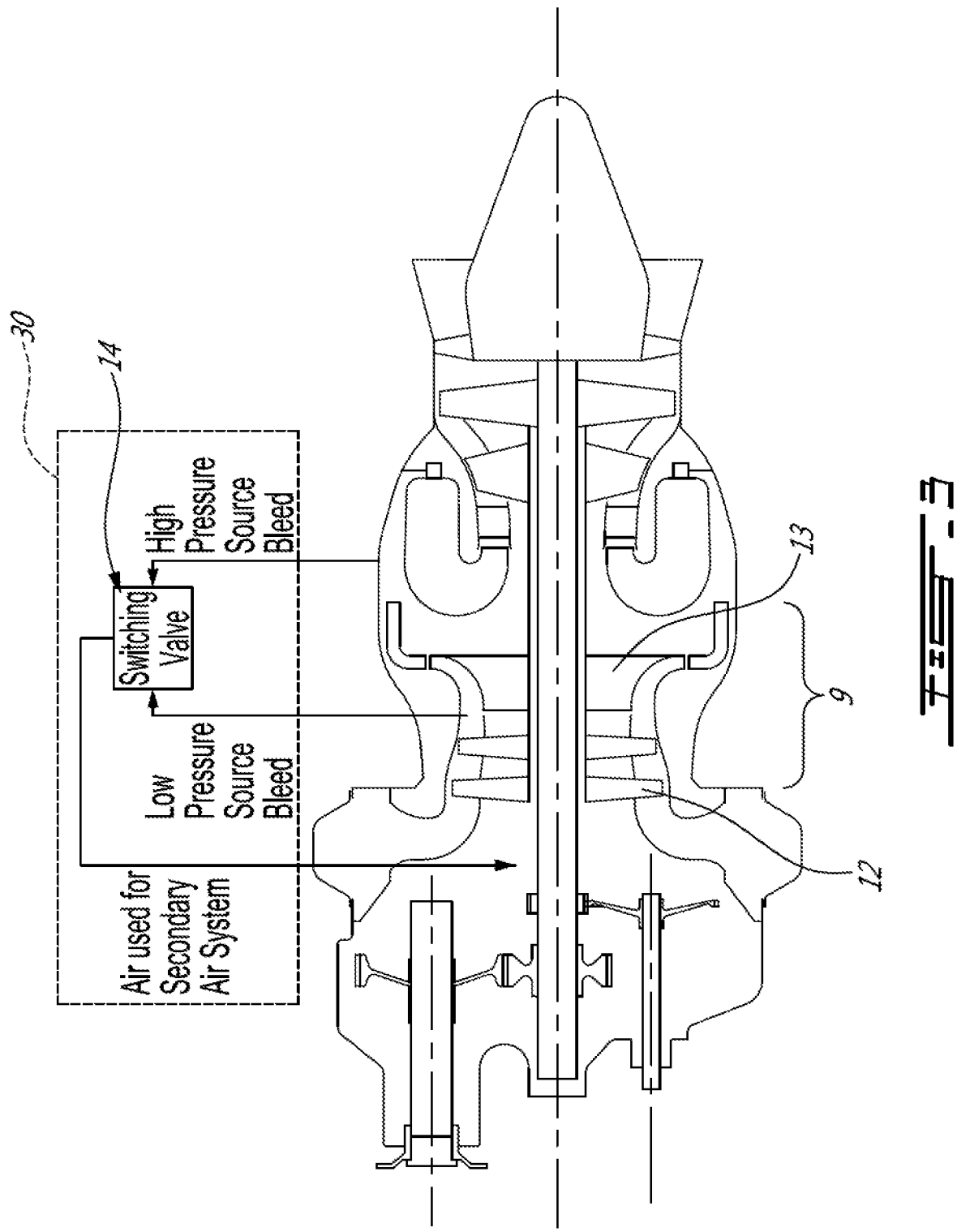

FIG. 1A depicts an exemplary multi-engine aircraft 1, which in this case is a helicopter. The aircraft 1 may however also be a fixed-wing aircraft. The aircraft 1 includes at least two gas turbine engines 10, labeled in FIG. 1A as "ENGINE 1" and "ENGINE 2". These two engines may be interconnected, in the case of the depicted helicopter application, by a common gearbox to form a multi-engine system 50 as shown in FIG. 1B.

FIG. 1B illustrates a schematic representation of an exemplary multi-engine system 50 that may be used as a power plant for the aircraft 1. The multi-engine system 50 comprises two or more gas turbine engines 10. The multi-engine system 50 may manage the operation of the engines 10, as will be described in further detail below. The multi-engine system 50 may be used as a dual engine powerplant for an aircraft, such as a helicopter. In addition to airborne applications, the multi-engine system 50 may be used in marine and/or industrial applications.

More particularly, the multi-engine system 50 of this embodiment includes first and second turboshaft engines 10 each having a respective transmission 38 which are interconnected by a common output gearbox 40 to drive a common load 44. In one embodiment, the common load 44 may comprise a rotary wing of a rotary-wing aircraft. For example, the common load 44 may be a main rotor of the helicopter 1. Depending on the type of the common load 44 and on the operating speed thereof, each of turboshaft engines 10 may be drivingly coupled to the common load 44 via the output gearbox 40, which may be of the speed-reduction type.

For example, the gear box 40 may have a plurality of transmission shafts 42 to receive mechanical energy from respective output shafts 11 of respective turboshaft engines 10. The gear box 40 may be configured to direct at least some of the combined mechanical energy from the plurality of the turboshaft engines 10 toward a common output shaft 42 for driving the common load 44 at a suitable operating (e.g., rotational) speed. It is understood that the multi-engine system 50 may also be configured, for example, to drive accessories and/or other elements of an associated aircraft. As will be described, the gear box 40 may be configured to permit the common load 44 to be driven by either of the turboshaft engines 100 or, by a combination of both engines 10 together.

Referring now to FIG. 2, the gas turbine engine 10 is of a type provided, in one embodiment, for use in subsonic flight, generally comprising in serial flow communication a compressor section 9 for pressurizing the air, a combustor 8 in which the compressed air is mixed with fuel and ignited for generating an annular stream of hot combustion gases, and a turbine section 5 for extracting energy from the combustion gases.

The engine 10 depicted in FIG. 2 is a turboshaft gas turbine engine, and therefore includes a reduction gearbox and transmission 38 with an output shaft 42 which is configured to provide power output from the engine 10 to the common aircraft gearbox 40 of the multi-engine system 50 of FIG. 1B. However, it is to be understood that the present disclosure may also be applicable to other types of gas turbine engines, including turboprops and turbofans for example.

Referring still to FIG. 2, the gas turbine engine 10 includes an air inlet 2 via which air enters the engine 10 before being directed into the compressor section 9 of the engine. In the depicted embodiment, the compressor section 9 includes a low-pressure axial compressor 12 and a high-pressure centrifugal compressor 13. Compressed air exits the high pressure compressor 13 through a diffuser 6 and is contained within a plenum 7 that surrounds the combustor 8. Fuel is supplied to the combustor 8 through fuel nozzles fed by a fuel system, wherein the injected fuel from the fuel nozzles is mixed with the compressed air within the combustor 8 thereby causing the fuel-air mixture to be ignited within the combustion chamber. A portion of the compressed air within the plenum 7 is therefore admitted into the combustor 8 through orifices in the side walls to create a cooling air curtain along the combustor walls. A portion of the compressed air is also is used as bleed air for pneumatic systems within and/or external to the engine. The annular stream of hot combustion gases exiting the combustor 8 is directed to a downstream turbine section 5 for extracting energy from the combustion gases before exiting the engine as exhaust. The turbine section 5 may include one or more turbine rotors. In the embodiment of FIG. 2, a high pressure turbine 4 drives a high pressure engine shaft to which both the low and high pressure compressors 12 and 13 are connected for driving same, and a low pressure turbine 3 drives a low pressure turbine shaft which is coaxial with the low pressure engine shaft and drives the power output shaft 11, and the gearbox 38, of the engine 10.

Figure 4:
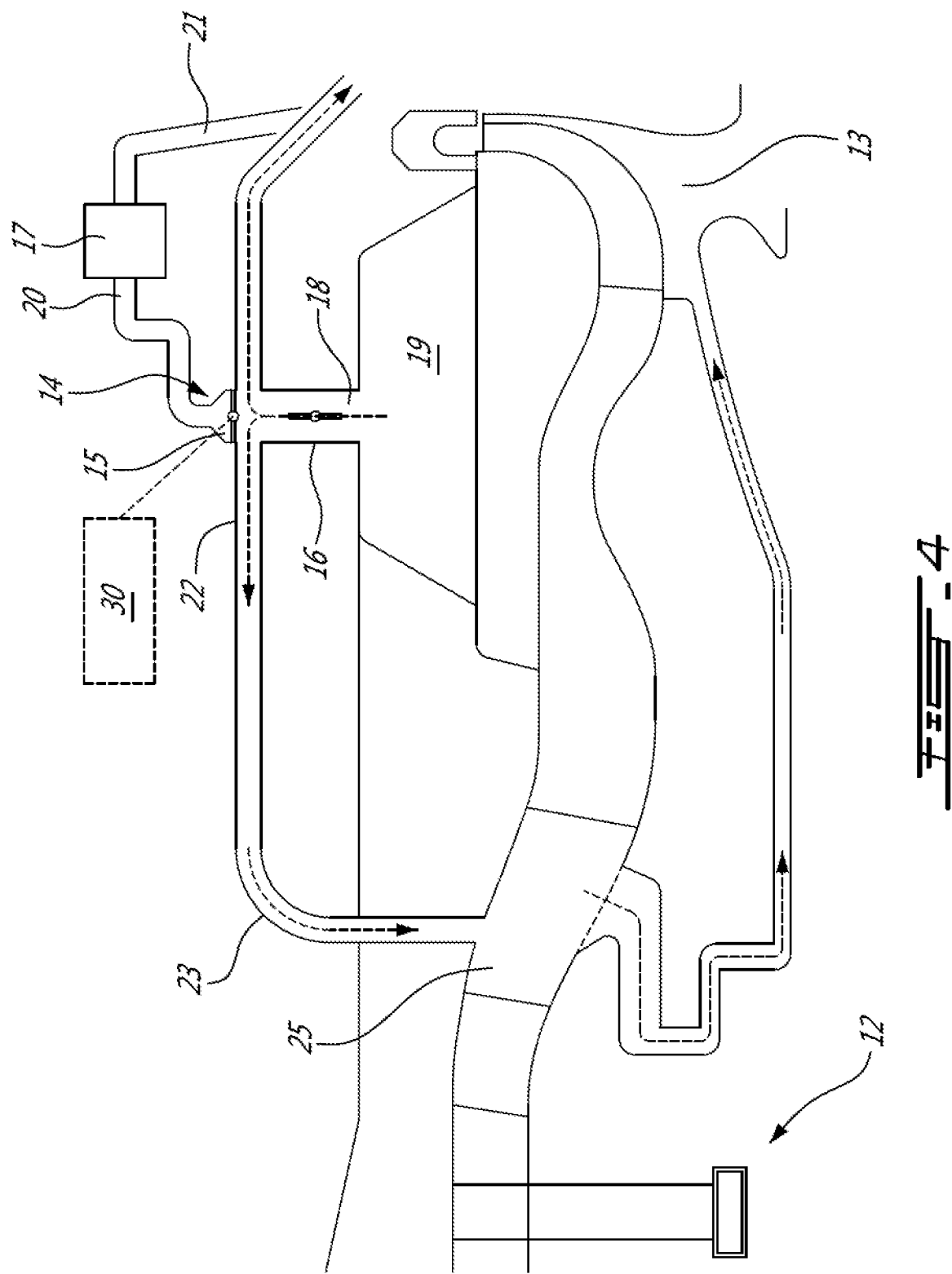
FIG. 4 is an enlarged axial cross-section view of the compressor section of the gas turbine engine of FIG. 2, showing the air system switching system of FIG. 3 operating in a first mode.

As will now be described in further detail, FIGS. 3 to 5 show axial sectional views of the compressor section 9 of the gas turbine engine 10, in particular the low pressure axial compressor(s) 12 and high pressure centrifugal compressor 13. While the exemplary embodiment includes an axial compressor and a centrifugal compressor, it is to be understood that other configurations (e.g. two or more axial compressors, two or more centrifugal compressors, a different combination of the two, etc.) is also possible.

The present description relates generally to operating a multi-engine aircraft 1, where a first engine of the gas turbine engines 10 is capable of providing motive power in flight to the aircraft 1 when operating in a "powered mode", and a second engine of the gas turbine engines 10 can be switched between a powered mode, whereby the second engine also provides motive power to the aircraft, and a lower-power "standby mode", whereby substantially no (or very little) motive power is provide to the aircraft. The second engine may therefore be switched into, and maintained in, this very low-power standby mode during flight. The low-power standby mode of the second engine includes, but is not limited to a significantly reduced power mode or a so-called "sub-idle" mode in this example. By operating the second engine in this standby mode during flight, fuel consumption of the second engine, and therefore over the overall powerplant, is reduced. The second engine however remains able to return to normal operational power (e.g. full power) if additional power needed by the aircraft.

The first engine as described herein may be referred to as a "main" or "primary" engine, and the second engine may be referred to herein as a "reserve" engine. However, it is to be understood that both are capable of operating a full power if desired/necessary.

As seen in FIGS. 3 to 5, at least the second engine 10 of the aircraft 1 has a compressed air switching system 30 that comprises and is in communication with a switching valve 14. The switching valve 14 may also be referred to herein as an "input selector switch" 14. The compressed air switching system 30 may be controlled by the engine control system, such as a full-authority digital engine control (FADEC) system for example. In the example illustrated the input selector switch 14 has three main components, namely, a manifold 15, a check valve 16, and a solenoid valve 17. The manifold 15 has a low pressure inlet 18 including the check valve 16 in communication with a low pressure air plenum 19. The manifold 15 has a high pressure inlet 20 including the solenoid valve 17 in communication with a high pressure air conduit 21, derived from the output of the high pressure centrifugal compressor 13. The manifold 15 conveys low or high pressure air via a manifold outlet 22 in communication with the bleed air system of the engine and aircraft.

In the example shown, the combination of the manifold 15, check valve 16, and solenoid valve 17 form the switching valve 14. Other configurations of switching valve 14 will be apparent to those skilled in the art including a poppet valve, a sliding spool valve or a ball valve.

FIG. 4 shows the switching valve 14, and thus the compressed air switching system 30, in the powered (or "motive") mode, where the solenoid valve 17 is closed and the check valve 16 is open, thereby connecting the low pressure inlet 18 and the switch outlet 22. In the powered/powered mode of FIG. 4, the low pressure air from the plenum 19 is provided through the manifold 15 into the switch outlet 22.

FIG. 5 shows the switching valve 14, and thus the compressed air switching system 30, in the standby mode, where the solenoid valve 17 is open and the check valve 16 is closed, thereby connecting the high pressure inlet 20 and the switch outlet 22. In the standby mode of FIG. 5, the high pressure air from the high pressure air conduit 21 is provided through the manifold 15 into the switch outlet 22.

As shown in FIG. 4 when the switching valve 14 is in the powered mode, low pressure compressed air is provided to the bleed air system (i.e. the secondary air system) for an engine operation system via the switch outlet 22. A compressed air passage 23 from the switch outlet 22 leads to an engine shaft 24 wherein the compressed air passage 23 passes through a stationary strut 25 within the gas path.

However when the engine speed is lowered to a level at or below idle, such as during "sub-idle" operation, the pressure of compressed air available from the low pressure plenum 19 may be insufficient for engine operations such as engine cooling and maintaining oil seals for the bearing cavities within this engine (i.e. the second engine). "Sub-idle" operation in this sense is understood to mean that the second engine is operating at a bare minimum speed to remain in operation, but engine speed and/or power output may be even lower than in a traditional "idle" operating state. In such sub-idle operations, the switching valve 14 is moved to the standby mode shown in FIG. 5 (i.e. solenoid valve 17 is open and the check valve 16 is closed). In the standby mode of FIG. 5, the high pressure air from the high pressure air conduit 21 is provided through the manifold 15 to the engine operating system to cool the turbines 11, and maintain oil seals with compressed air of sufficiently high pressure.

When the input selector switch 14 is in the powered mode of FIG. 4, the engine is operating in a normal flight condition at high power levels to provide a relatively high degree of motive power to the aircraft. During the powered mode, a relatively high quantity of compressed bleed air is provided from the low pressure air plenum 19. The bleed air in the powered mode is provided to the aircraft operation system at sufficient pressure and quantity for aircraft functions such as cabin pressurization, engine starting, pneumatic systems etc. as well as for the engine operating system to maintain engine functions such as cooling the turbines 11 and maintaining oil seals.

When the switching valve is in the standby mode of FIG. 5, a relatively low degree of motive power, or substantially no motive power, is provided to the aircraft and a relatively low quantity of aircraft bleed air is provided for the aircraft operation requirements.

During the standby mode, the available compressed air is diverted to essential engine functions and is not consumed by aircraft operations. In the standby mode, the second engine power output is less than the first engine power output. In one embodiment, the first engine provides at least 2 times more power output than the second engine. The second engine power output may also be such that a power differential, i.e. a difference between the first engine power and the second engine power, as a percentage of the first engine power, is at least 20%. This differential power between the two engines may however be much greater, for example 40%, 60%, 90%, 95% or greater. Accordingly, in certain embodiments, the power output differential is between 20-95%, or alternately between 40-95%, or alternately still greater than 90%.

The second engine is controlled during idle operation, when the switching valve is in the standby mode, to generate a motive power output differential, defined as a percentage of the second engine power output to the first engine power output, of at least 20%, and may be greater than 90%. It should however be noted that the gas generator speed of the second engine, sometimes referred to as Ng, may however not correspond to the reduced power output of the second engine. Because the power output of the engine can be controlled by other means, such as by controlling variable guide vanes, the gas generator speed of the second engine may be much closer to that of the first engine during operation, even when the above-noted power output differentials remain.

To operate the solenoid valve 17, the solenoid valve 17 is in electric communication with the engine control system that includes sensing the second engine power output and the first engine power output. A comparison is made and a motive power output differential is determined. When the motive power output differential is below a threshold value the control system communicates an open signal to the solenoid actuated valve 17.

When the motive power output differential is reduced below the threshold value, the solenoid valve 17 is actuated to raise the manifold air pressure in the manifold 15 above the air pressure of the low pressure air source 19 which automatically closes the (normally open) one way check valve 16. As a result the switching valve 14 is switched between the powered mode and the standby mode depending on the signal received from the control system and power output sensors.

The control system can control the second engine power output by controlling a plurality of variable guide vanes. While controlling the second engine operation during the standby mode, the rotational speed of the second engine can be maintained in the range of 40-70% of the rotational speed of the first engine, while controlling the variable guide vanes to increase or decrease the second engine power output.

Therefore in two possible modes, low motive power (standby mode) and high motive power (powered mode), the method of operating the multi-engine aircraft during flight provides adequate compressed air to the second engine for the engine operation system uses, for example to actuate an air pressure operated oil retention seal, to cool an air cooled engine component, or to cool a turbine. Depending on the most efficient available source of compressed air, the switching valve 14 receives air from the low pressure air plenum 19 or the high pressure air conduit 21.

Accordingly, the present description provides a method of operating an aircraft propulsion gas turbine engine in a multi-engine aircraft, by operating at least one second engine in a powered mode to provide motive power in flight to the aircraft and supplying compressor pressure bleed air to the engine and aircraft, and while in flight operating the second engine in an standby mode to provide little or no motive power to the aircraft, switching to higher pressure bleed air source to provide second engine bleed air while substantially ceasing to supply bleed air to the aircraft.

In particular embodiments, the present disclosure includes a method of operating a gas turbine engine including supplying "P2.X" air to pressurize seals and, when engine speed drops below a threshold, switching to higher pressure air source. An air switching system for a secondary air system of a gas turbine engine is therefore provided, which may include a solenoid operated shut off valve, which actuates to switch between first and second bleed air sources, and a check valve. The solenoid valve can be opened and closed, to respectively permit or block higher pressure air (e.g. "P3" air) from being directed to the compressor cavities for cooling and/or sealing purposes. When the engine is operating normally in a powered mode, the solenoid valve is closed and the check valve is open, thereby permitting lower pressure air (e.g. "P2.8" air) to be fed to the compressor cavities for sealing and/or cooling purposes. When the engine is operating in a standby mode with a lower power/speed range (e.g. a "sub-idle" operation as described herein), the solenoid valve is open and the check valve is closed, thereby forcing the higher pressure P3 air to be fed to the compressor cavities for sealing and/or cooling purposes. Accordingly, higher pressure P3 air can be used during sub-idle engine conditions in order to ensure proper engine operation, and switching between the two air system configurations is possible when desired due to the solenoid driven switching valve. Thus, the lowest pressure air source can be selected by the present air switching system for various different engine operating ranges/conditions, to ensure optimal engine operation.

The above description is meant to be exemplary only, and one skilled in the relevant arts will recognize that changes may be made to the embodiments described without departing from the scope of the invention disclosed. The present disclosure may be embodied in other specific forms without departing from the subject matter of the claims. The present disclosure is intended to cover and embrace all suitable changes in technology. Modifications which fall within the scope of the present invention will be apparent to those skilled in the art, in light of a review of this disclosure, and such modifications are intended to fall within the appended claims. Also, the scope of the claims should not be limited by the embodiments set forth in the examples, but should be given the broadest interpretation consistent with the description as a whole.

What is claimed is:

1. A method of operating a multi-engine aircraft having two or more gas turbine engines, the method comprising:
   in flight, operating a first engine of the gas turbine engines in a powered mode to provide motive power to the aircraft by driving a common rotatable load;
   in flight, operating a second engine of the gas turbine engines in either a powered mode to provide motive power to the aircraft by driving the common rotatable load or in a standby mode to provide substantially no motive power to the aircraft;
   when operating the second engine in the powered mode, bleeding pressurized air from a first bleed location of a compressor section of the second engine;
   when operating the second engine in the standby mode, bleeding pressurized air from a second bleed location of the compressor section of the second engine, the second bleed location of the compressor section being downstream of the first bleed location relative to main gas flow through the compressor section of the second engine; and
   fluidly connecting either the first bleed location or the second bleed location to a bleed air system of the second engine, the bleed air system supplying the pressurized air to one or more components of the second engine in need of pressurized air.

2. The method according to claim 1, further comprising, in flight, switching the second engine between the powered mode and the standby mode.

3. The method according to claim 2, wherein the switching of the second engine between the powered mode and the standby mode includes fluidly interconnecting an inlet of the bleed air system with the first bleed location or the second bleed location.

4. The method according to claim 3, wherein the fluidly interconnecting of the inlet of the bleed air system with the first bleed location or the second location includes operating an input selector switch of the bleed air system.

5. The method according to claim 1, further comprising reducing fuel consumption of the multi-engine aircraft by switching, in flight, the second engine from the powered mode to the standby mode.

6. The method according to claim 1, further comprising supplying the pressurized air bled from the first bleed location to the bleed system of the second engine during the powered mode.

7. The method according to claim 1, further comprising maintaining the pressurized air from the bleed system within the second engine during the standby mode and the powered mode.

8. The method according to claim 7, wherein the supplying of the pressurized air to the one or more components of the second engine in need of pressurized air includes pressurizing seals and/or cooling turbines of the second engine with the pressurized air.

9. The method according to claim 1, further comprising maintaining a power output differential between the first engine operating in the powered mode and the second engine operating in the standby mode, defined as a percentage of a second engine power to a first engine power, of between 20% and 95%.

10. The method according to claim 1, further comprising, when operating the second engine in the standby mode, maintaining a rotational speed of the second engine in the range of 40 to 70% of a rotational speed of the first engine operating in the powered mode.

11. The method according to claim 10, further comprising switching the second engine from the powered mode to the standby mode by: opening an actuated valve within a high pressure inlet of the second engine to automatically close a normally open check valve within a low pressure inlet of the second engine.

12. The method according to claim 11 further comprising:
- sensing the second engine power output and the first engine power output; and
- communicating an open signal to the actuated valve when the motive power output differential is below a threshold value.

* * * * *